Patented Oct. 10, 1950

2,525,508

UNITED STATES PATENT OFFICE 2,525,508

NITRATION OF O-SUBSTITUTED AROMATIC AMINES

Bernhard G. Zimmerman, Westfield, N. J., assignor to General Aniline & Film Corporation, New York, N. Y., a corporation of Delaware No Drawing. Application May 5, 1945, Serial No. 592,284

9 Claims. (Cl. 260—575)

The present invention relates to an improved process for the direct nitration of ortho-substituted aromatic primary amino compounds and is particularly concerned with an improved process whereby the nitro group is introduced in meta position to the amino group of an aromatic amino compound which, in ortho position to the amino group, bears another substituent. The compounds formed by the process of the present invention have the following general formula:

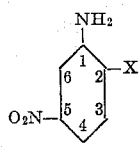

in which X is alkyl, alkoxy or halogen.

It is generally agreed that since amino compounds are very susceptible to oxidation, it is necessary to protect the —NH$_2$ group during the nitration by acylation. When this procedure is employed with ortho-substituted amino compounds, that is, the compound is first acetylated and then nitrated, a mixture of 4-nitro and 6-nitro isomers is obtained with very little, if any, yield of the 5-nitro-o-anisidine.

Direct nitration has been employed to nitrate other types of aromatic amino compounds, such as the isomeric para-substituted aromatic amino compounds, but no commercially acceptable method has heretofore been available for the production of 5-nitro-ortho-substituted amino compounds. Thus, para-toluidine may be nitrated in large amounts of sulfuric acid to yield the corresponding 5-nitro-p-toluidine. Other aromatic amines may also be directly nitrated to yield the meta to the amino-substituted nitro compounds. When the amino group is para to the other substituent group present in the ring, such as in para-anisidine, the compound may be directly nitrated to yield the meta to the amino-substituted nitro compounds without difficulty and generally with good yields. However, when the amino group is ortho to the other substituent group present in the ring, such as in ortho-anisidine, then the compound is only directly nitrated with great difficulty and low yields.

The direct nitration of ortho-substituted aromatic amino compounds, such as ortho-anisidine, has been effected by carrying out the nitration at exceptionally low temperatures, —10° C. to —15° C., while employing large amounts of sulfuric acid as a solvent. This requires special cooling and is not satisfactory for commercial production. The large amount of sulfuric acid required for dissolving the amino compound is rather expensive and causes sulfonation to take place with consequent reduction of the yield. When, however, the amount of sulfuric acid is decreased and the temperature raised to within practical limits, i. e., —5° C. to +5° C., sulfonation occurs before all of the amino compound is dissolved.

Due to these difficulties, the only known commercial method for the production of 5-nitro-ortho-substituted amino compounds, such as 5-nitro-o-anisidine, is by treating the nitric acid salt of ortho-anisidine with concentrated sulfuric acid at low temperatures. This method requires two steps; first, the preparation of the nitric acid salt from the ortho-anisidine and, second, the conversion of the nitric acid salt into 5-nitro-o-anisidine. This method not only requires a large amount of equipment and labor, but the first step requires special equipment of stainless steel.

I have discovered that by operating in accordance with the present invention, ortho-substituted aromatic amino compounds may be directly nitrated to yield the meta to the amino-substituted nitro compound in good yield.

Briefly stated, the present invention comprises adding the ortho-substituted amino compound to be nitrated and the nitrating agent, such as mixed acid (sulfuric acid and nitric acid) simultaneously and at substantially equivalent rates, to the solvent (sulfuric acid) employed for the reaction. In this manner, an extremely good yield of good quality of the desired product is obtained and previous difficulties of low temperatures, low yields, inferior product, large amounts of sulfuric acid and sulfonation, are overcome. The desired product may be isolated either as the free base or as the acid salt.

The specific details of the present invention are illustrated in the following specific example.

*Example 1*

936 parts of 100% H$_2$SO$_4$ (monohydrate) and 39 parts of ice are charged into a 2 liter fusion pot. The concentration of sulfuric acid in the pot, therefore, was 96%. The mixture was allowed to cool to 20° C. and 7.5 parts of urea were added. It was then cooled to —5° C. and ortho anisidine was slowly added to the mixture. After a period of 5 minutes, the addition of mixed acid (HNO$_3$=31.43%, H$_2$SO$_4$=63.70%, H$_2$O=4.87%) was started at about the same rate as the ortho anisidine. During the addition of the mixed acid and the ortho anisidine, the temperature was maintained at from —5° C. to 0° C. and they were added at such a rate that the addition required 3 to 4 hours. A total of 246 parts of ortho anisidine and 389.6 parts of mixed acid were added during this period. After all the mixed acid and ortho anisidine had been added, the temperature was allowed to rise to about 5° C. and this temperature maintained for an additional 3 hours. The nitration mixture was then poured slowly into 1800 parts of ice and 400 parts of water and the nitration pot washed out with 50 parts of 96% $H_2SO_4$. This mixture was then heated slowly with a low flame to 25° C. over a period of 1 to 2 hours to bring it into solution and was stirred slowly for 1 hour at 25° C. 30 parts of activated charcoal was then added and the mixture stirred overnight at 25° C. to decolorize it. The mixture was then filtered and the filter cake washed with 196 parts of ice and 110 parts of 100% $H_2SO_4$ (monohydrate). 800 parts of salt was then added to the filtrate, which was then stirred for at least 4 hours, during which time, the hydrochloride of 5-nitro-ortho-anisidine was precipitated. The thus obtained mixture was then filtered and the filter cake washed with cold water containing 60 parts of salt and 0.5 part of concentrated hydrochloric acid per wash. The filter cake was placed in a vacuum oven and dried at 55° C. The free base is obtained from the hydrochloride salt by neutralizing with caustic soda.

It should be understood that the foregoing is an illustration of a preferred embodiment of the invention and that various modifications which may be made therein will suggest themselves to those skilled in the art. Thus, the concentration of the acid employed as a solvent during the reaction may be varied from 80 to 100%, the particular concentration depending, to some extent, on the specific compound being nitrated and its relative solubility in acid. Other solvents which are equivalents of sulfuric acid in the present process and which may be substituted therefor, include acetic acid and acetic anhydride. The urea specified in the specific example is employed to decompose any nitrous acid which may be present or formed during the reaction and it should be understood that its presence is not essential to the operability of the process. It should also be understood that in place of the mixed acid specified as the nitrating agent, other nitrating agents, such as nitrates, dilute nitric acid and nitric acid mixed with other solvents or acids, acetic acid, acetic anhydride, etc., may be employed.

As mentioned previously, an important feature of the present invention is the simultaneous addition to the solvent (sulfuric acid) employed for the reaction of the ortho-substituted aromatic amino compound to be nitrated and the nitrating agent at substantially equal rates. Any excess of nitrating agent (nitric acid) will cause dinitration, and it is therefore desirable, in order to avoid the formation of the dinitrated product, that a slight excess of the ortho-substituted aromatic amino compound be present. This is particularly important at the start of the reaction and in order to assure the presence of such a slight excess, it is preferable to have a small amount of the aromatic amino compound present in the solvent before the introduction of the nitrating agent is initiated. This procedure has been illustrated in the specific example and is a preferred manner of practicing the present invention.

It will also be appreciated that ortho anisidine is merely illustrative of the ortho-substituted aromatic amino compounds which may be nitrated in accordance with the present invention and that the process is applicable to other compounds of this type, such as, ortho toluidine, ortho chloraniline or any other ortho-substituted aromatic amino derivative of the formula

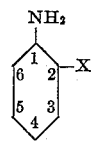

in which X is alkyl, alkoxy or halogen, and which is unsubstituted in 5 position.

I claim:

1. The process of producing 5 nitro derivatives of ortho-substituted aromatic amines of the formula

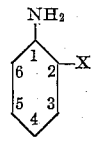

wherein X is a member of the group consisting of alkyl, alkoxy and halogen radicals, while avoiding the formation of isomers and by-products which comprises slowly introducing said amine into a solvent acid therefor, simultaneously and at a substantially equivalent rate, introducing a nitrating agent containing nitric acid into said solvent and maintaining the temperature of said solvent at from —5° C. to +5° C. during the addition of said amine and said nitrating agent thereto.

2. The process of producing 5 nitro derivatives of ortho-substituted aromatic amines of the formula

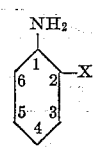

wherein X is a member of the group consisting of alkyl, alkoxy and halogen radicals, while avoiding the formation of isomers and by-products which comprises slowly introducing said amine into cold sulfuric acid, simultaneously and at a substantially equivalent rate, introducing a nitrating agent containing nitric acid into said sulfuric acid and maintaining the temperature of said sulfuric acid at from —5° C. to +5° C. during the addition of said amine and said nitrating agent thereto.

3. The process of producing 5 nitro derivatives of ortho-substituted aromatic amines of the formula

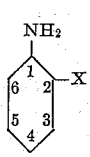

wherein X is a member of the group consisting of alkyl, alkoxy and halogen radicals, while avoiding the formation of isomers and by-products which comprises slowly introducing said amine into cold sulfuric acid containing a minor amount of urea, simultaneously and at a substantially equivalent rate, introducing a nitrating agent containing nitric acid into said sulfuric acid and maintaining the temperature of said sulfuric acid at from —5° C. to +5° C. during the addition of said amine and said nitrating agent thereto.

4. The process of producing 5 nitro derivatives of ortho-substituted aromatic amines of the formula

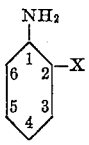

wherein X is a member of the group consisting of alkyl, alkoxy and halogen radicals, while avoiding the formation of isomers and by-products which comprises slowly introducing a minor amount of said amine into a solvent acid therefor, thereafter continuing the introduction of said amine into said solvent and simultaneously and at a substantially equivalent rate, introducing a nitrating agent containing nitric acid into said solvent and maintaining the temperature of said solvent at from —5° C. to +5° C. during the addition of said amine and said nitrating agent thereto.

5. The process of producing 5 nitro derivatives of ortho-substituted aromatic amines of the formula

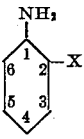

wherein X is a member of the group consisting of alkyl, alkoxy and halogen radicals, while avoiding the formation of isomers and by-products which comprises slowly introducing a minor amount of said amine into cold sulfuric acid and thereafter continuing the slow addition of said amine into said sulfuric acid and simultaneously and at a substantially equivalent rate, introducing a nitrating agent containing nitric acid into said sulfuric acid and maintaining the temperature of said sulfuric acid at from —5° C. to +5° C. during the addition of said amine and said nitrating agent thereto.

6. The process of producing 5-nitro ortho-anisidine, while avoiding the formation of isomers and by-products which comprises slowly introducing said ortho-anisidine into a solvent acid therefor, simultaneously and at a substantially equivalent rate, introducing a nitrating agent containing nitric acid into said solvent and maintaining the temperature of said solvent at from —5° C. to +5° C. during the addition of said amine and said nitrating agent thereto.

7. The process of producing 5-nitro ortho-anisidine, while avoiding the formation of isomers and by-products which comprises slowly introducing said ortho-anisidine into cold sulfuric acid, simultaneously and at a substantially equivalent rate, introducing a nitrating agent containing nitric acid into said sulfuric acid and maintaining the temperature of said sulfuric acid at from —5° C. to +5° C. during the addition of said ortho-anisidine and said nitrating agent thereto.

8. The process of producing 5-nitro-ortho-anisidine, while avoiding the formation of isomers and by-products which comprises slowly introducing a minor amount of said ortho-anisidine into a solvent acid therefor, thereafter continuing the slow addition of said ortho-anisidine to said solvent and simultaneously and at a substantially equivalent rate, introducing a nitrating agent containing nitric acid into said solvent and maintaining the temperature of said solvent at from —5° C. to +5° C. during the addition of said ortho-anisidine and said nitrating agent thereto.

9. The process of producing 5-nitro ortho-anisidine, while avoiding the formation of isomers and by-products which comprises slowly introducing a minor amount of ortho-anisidine into cold sulfuric acid, thereafter continuing the slow addition of said ortho-anisidine to said sulfuric acid and simultaneously and at a substantially equivalent rate, introducing a nitrating agent containing nitric acid into said sulfuric acid and maintaining the temperature of said sulfuric acid at from —5° C to +5° C. during the addition of said ortho-anisidine and said nitrating agent thereto.

BERNHARD G. ZIMMERMAN.

REFERENCES CITED

The following references are of record in the file of this patent:

UNITED STATES PATENTS

| Number | Name | Date |
|---|---|---|
| 1,332,680 | Phillips | Mar. 2, 1920 |
| 1,998,794 | Tinker | Apr. 23, 1935 |
| 2,194,923 | Christiansen | Mar. 26, 1940 |
| 2,207,727 | Galloway | July 16, 1940 |